(12) United States Patent
Scharlach et al.

(10) Patent No.: US 10,773,581 B2
(45) Date of Patent: Sep. 15, 2020

(54) DRIVE DEVICE

(71) Applicant: AUDI AG, Ingolstadt (DE)

(72) Inventors: Albert Scharlach, Oberdolling (DE); Sebastian Albl, Gaimersheim (DE); Manuel Schreiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 159 days.

(21) Appl. No.: 16/109,964

(22) Filed: Aug. 23, 2018

(65) Prior Publication Data

US 2019/0118630 A1 Apr. 25, 2019

(30) Foreign Application Priority Data

Oct. 23, 2017 (DE) .................. 10 2017 218 868

(51) Int. Cl.
| | |
|---|---|
| *B60K 1/00* | (2006.01) |
| *B60K 17/00* | (2006.01) |
| *B62D 65/10* | (2006.01) |

(52) U.S. Cl.
CPC .............. *B60K 1/00* (2013.01); *B60K 17/00* (2013.01); *B62D 65/10* (2013.01)

(58) Field of Classification Search
CPC .......... B60K 1/00; B60K 17/00; B60K 17/16; B62D 65/10
See application file for complete search history.

(56) References Cited

U.S. PATENT DOCUMENTS

| | | | | |
|---|---|---|---|---|
| 4,046,211 A | * | 9/1977 | Allen ............... | B60G 17/01916 180/41 |
| 5,927,417 A | * | 7/1999 | Brunner ............ | B60K 1/02 180/65.6 |
| 6,166,498 A | * | 12/2000 | Yamaguchi ........ | B60L 50/16 318/34 |
| 6,575,865 B2 | * | 6/2003 | Takenaka .......... | B60K 6/365 180/65.235 |
| 7,611,432 B2 | * | 11/2009 | Maguire ............ | B60L 50/16 475/5 |
| 7,786,640 B2 | * | 8/2010 | Sada ................ | B60K 6/445 310/112 |
| 7,847,450 B2 | * | 12/2010 | Kakuda ............ | B60L 3/0061 310/89 |
| 7,855,887 B2 | * | 12/2010 | Kakuda ............ | B60K 6/445 361/699 |

(Continued)

FOREIGN PATENT DOCUMENTS

| | | |
|---|---|---|
| DE | 197 00 893 C1 | 9/1998 |
| DE | 20 2005 019 438 U1 | 5/2007 |

(Continued)

OTHER PUBLICATIONS

The extended European search report dated Mar. 8, 2019, in corresponding European patent application No. 18186299.6 including partial machine-generated English language translation; 11 pgs.

(Continued)

*Primary Examiner* — Jacob B Meyer
(74) *Attorney, Agent, or Firm* — Maier & Maier, PLLC

(57) ABSTRACT

A drive device for a vehicle, which has an electric motor, a power electronics unit and a transmission. The power electronics unit is arranged between a shaft of the electric motor and a shaft of the transmission.

9 Claims, 2 Drawing Sheets

(56) References Cited

U.S. PATENT DOCUMENTS

| | | | | |
|---|---|---|---|---|
| 7,896,116 | B2* | 3/2011 | Tatematsu | B60K 6/26 180/65.6 |
| 7,975,571 | B2* | 7/2011 | Sanji | B60K 6/40 74/661 |
| 8,074,753 | B2* | 12/2011 | Tahara | H02K 9/19 180/65.21 |
| 8,181,731 | B2* | 5/2012 | Bessho | B60L 50/16 180/305 |
| 8,201,650 | B2* | 6/2012 | Yoshida | H02K 51/00 180/65.22 |
| 8,397,845 | B2* | 3/2013 | Yoshida | B60L 50/16 180/65.1 |
| 8,813,896 | B2* | 8/2014 | Littlefield | F16H 57/025 180/274 |
| 9,295,186 | B2* | 3/2016 | Ivan | H05K 5/0082 |
| 9,358,870 | B2* | 6/2016 | Hotta | B60L 50/51 |
| 9,446,657 | B2* | 9/2016 | Takahashi | H05K 5/061 |
| 9,539,890 | B2* | 1/2017 | Miyazawa | B60L 50/16 |
| 9,802,470 | B2* | 10/2017 | Miyazawa | B60L 9/18 |
| 9,849,791 | B2* | 12/2017 | Suzuki | F16H 57/02 |
| 10,008,904 | B2* | 6/2018 | Kuramochi | B60K 6/405 |
| 10,189,308 | B2* | 1/2019 | Albl | B60B 35/124 |
| 10,336,178 | B2* | 7/2019 | Albl | B60K 7/0007 |
| 10,391,849 | B2* | 8/2019 | Suzuki | H02K 11/33 |
| 10,581,295 | B2* | 3/2020 | Albl | H02K 5/225 |
| 2006/0225930 | A1* | 10/2006 | Schulte | B60K 6/48 180/65.1 |
| 2009/0014223 | A1* | 1/2009 | Jones | B60K 17/16 180/65.8 |
| 2009/0206709 | A1* | 8/2009 | Kakuda | H02K 7/006 310/68 D |
| 2009/0243443 | A1* | 10/2009 | Aoki | H02K 11/048 310/68 D |
| 2009/0267352 | A1* | 10/2009 | Sada | B60K 6/405 290/1 A |
| 2010/0072865 | A1* | 3/2010 | Endo | B60W 20/00 310/68 D |
| 2011/0039649 | A1* | 2/2011 | Tanae | B60W 10/06 475/5 |
| 2012/0090425 | A1* | 4/2012 | Kasuya | B60K 6/405 74/661 |
| 2012/0242198 | A1* | 9/2012 | Kasuya | B60K 6/48 310/68 B |
| 2013/0061703 | A1* | 3/2013 | Teramoto | F16H 55/14 74/434 |
| 2015/0251531 | A1* | 9/2015 | Hotta | B60K 1/00 180/65.25 |
| 2016/0039276 | A1* | 2/2016 | Takahashi | H05K 7/1432 180/65.21 |
| 2016/0052380 | A1* | 2/2016 | Miyazawa | B60K 6/40 180/65.21 |
| 2016/0072361 | A1* | 3/2016 | Kuramochi | B60K 6/405 310/68 D |
| 2017/0050514 | A1* | 2/2017 | Li | B60K 17/14 |
| 2017/0100998 | A1* | 4/2017 | Suzuki | H02K 11/33 |
| 2017/0158042 | A1* | 6/2017 | Miyazawa | B60L 15/007 |
| 2017/0232831 | A1* | 8/2017 | Agata | B60L 50/16 310/54 |
| 2017/0346361 | A1* | 11/2017 | Albl | H02K 11/33 |
| 2018/0112755 | A1* | 4/2018 | Littlefield | F16H 37/0813 |
| 2018/0145562 | A1* | 5/2018 | Scharlach | H02K 9/005 |
| 2018/0162215 | A1* | 6/2018 | Albl | B60K 7/0007 |
| 2018/0250982 | A1* | 9/2018 | Albl | B60B 35/124 |
| 2019/0118630 | A1* | 4/2019 | Scharlach | B60K 1/00 |
| 2019/0165647 | A1* | 5/2019 | Albl | H02K 1/185 |
| 2019/0375283 | A1* | 12/2019 | Matt | B60L 53/24 |
| 2019/0375305 | A1* | 12/2019 | Matt | B60K 7/0007 |

FOREIGN PATENT DOCUMENTS

| | | |
|---|---|---|
| DE | 10 2010 020 576 A1 | 11/2011 |
| DE | 10 2013 204 766 A1 | 9/2014 |
| JP | 2001-322439 A | 11/2001 |
| WO | 2013/069774 A1 | 5/2013 |

OTHER PUBLICATIONS

German Office Action dated Sep. 21, 2018, in connection with corresponding DE Application No. 10 2017 218 868.5 (11 pages including a partial English-language translation).

* cited by examiner

DRIVE DEVICE

FIELD

The invention relates to a drive device and a method for manufacturing a drive device.

BACKGROUND

A vehicle may have an electric motor with which the vehicle is driven. In this case, a power unit is assigned to the electric motor. In addition, the electric motor is connected to a transmission of the vehicle.

An electric drive system for a motor vehicle is known from the publication DE 10 2010 020 576 A1. This drive system comprises an energy storage device, an electric machine, and a power electronics unit that is arranged between the energy storage device and the electric machine.

A drive unit for a motor vehicle with an electric drive motor and a change-speed transmission is described in the publication DE 20 2005 019 438 U1. The drive motor and the change-speed transmission are arranged here in an integrated construction in a housing.

The publication DE 197 00 893 C1 describes a serial electric hybrid drive with a kinetic memory for an environmentally-friendly operation of a motor vehicle.

SUMMARY

Against this background, the object was to design a drive for a vehicle that would save on packing space.

This object is achieved with a drive device and a method having the features of the independent patent claims. Embodiments of the drive device and the method ensue from the dependent patent claims and the description.

The drive device for a vehicle according to the invention is designed for driving at least one wheel and/or at least one axle of the vehicle or for moving the vehicle, and has an electric motor, a power electronics unit, and a transmission. In this case, the power electronics unit is arranged between a shaft of the electric motor and a shaft of the transmission.

The transmission has a differential as at least one component or transmission component, wherein the differential comprises the shaft of the transmission, wherein the power electronics unit is arranged between the shaft of the electric motor and the shaft of the differential of the transmission.

The shaft of the electric motor and the shaft of the transmission are arranged parallel to one another in configuration. In this case, it is possible that both shafts are arranged or oriented perpendicular to a direction of travel of the vehicle.

Usually, the power electronics unit is arranged between the electric motor and the transmission, for example, the transmission component designed as the differential.

In addition, it is provided that the shaft of the electric motor is designed as a rotor shaft and the shaft of the transmission is designed as an output shaft.

Usually, the shaft of the electric motor and the shaft of the transmission can be connected and/or are connected to each other by way of at least one gearwheel, at least one shifting element, and/or at least one coupling or clutch as the at least one component of the transmission.

In configuration, the electric motor and the power electronics unit can be arranged or are arranged in a common housing. As an alternative thereto, the power electronics unit can be arranged or is arranged in its own housing, wherein the electric motor can also be arranged or is also arranged in its own housing.

In addition, at least one component of the transmission is arranged in at least a housing of its own. In this case, it is possible that the shaft of the transmission is arranged partially outside the at least one housing.

The method according to the invention is provided for manufacturing a drive device for a vehicle, which is composed of an electric motor, a power electronics unit, and a transmission, wherein, in the scope of the method, the power electronics unit is arranged between a shaft of the electric motor and a shaft of the transmission.

In the method, the electric motor and the at least one transmission component, for example, at least the two shafts of the electric motor and the transmission are joined together first. The power electronics unit is arranged only after this, between the shaft of the electric motor and the shaft of the transmission.

In configuration, the power electronics unit is pushed between the shaft of the electric motor and the shaft of the transmission. In this case, it is possible that the power electronics unit is pushed between the transmission, for example, the differential thereof, and the electric motor.

Furthermore, the power electronics unit is arranged in a housing that has an opening that can be closed by a cover, wherein the cover is opened, wherein, through the opening, the power electronics unit is arranged in the housing between the electric motor and the shaft of the transmission, and wherein the opening is again closed with the cover. In this case, the power electronics unit is arranged either in a housing that is only provided for the power electronics unit, or in a housing that is provided for the electric motor and the power electronics unit.

According to definition, the power electronics unit is arranged between the electric machine and at least one component or transmission component of the transmission, for example, the differential.

An embodiment of the drive device according to the invention can usually be manufactured by an embodiment of the method according to the invention. In this case, the power electronics unit is arranged between the shafts of the electric motor and the transmission, the shafts being arranged parallel to one another. According to definition, the shaft of the electric motor is designed as a rotor shaft, and/or is to be designated as such. The shaft of the transmission, for example, the differential of the transmission, according to definition, is designed as the output shaft, and/or is to be designated as such.

The proposed drive device thus requires a small packing space. If the drive device, for example, is designed for driving at least one rear wheel and/or a rear axle of the vehicle, it is possible to provide an increased volume for the trunk space of the vehicle. In addition, the power electronics unit can be arranged in a robust manner between the two shafts, wherein the power electronics unit is not directly impacted in the case of an accident or a vehicle crash. In addition, for example, an electronic contacting of the power electronics unit by which the power electronics unit is connected to the electric motor, for example, is protected due to the transmission, e.g., the differential of the transmission.

Additional advantages and embodiments of the invention result from the description and the appended drawings.

BRIEF DESCRIPTION OF THE DRAWINGS

The invention is presented schematically in the drawings on the basis of embodiments, and is described schematically and in detail with reference to the drawings.

The figures are described coherently and comprehensively; identical components are assigned the same reference numbers.

DETAILED DESCRIPTION

Figure 1A:
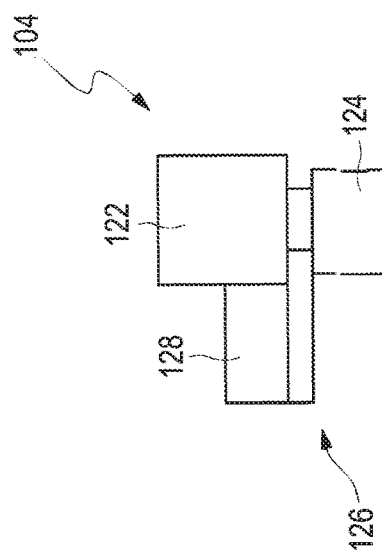
FIG. 1a shows, in a schematic representation, an example of a drive that is known from the prior art.
Figure 1C:
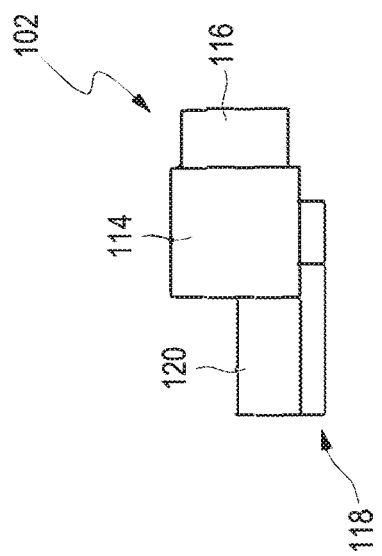
FIG. 1c shows, in a schematic representation, an example of a drive that is known from the prior art.
Figure 1E:
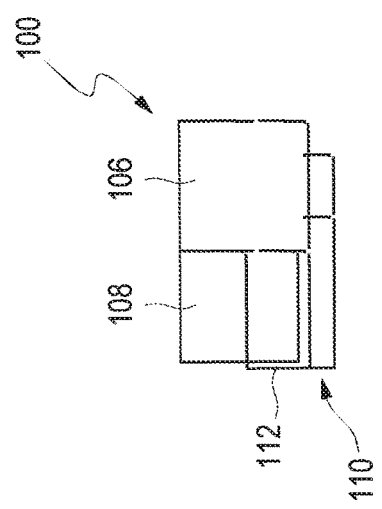
FIG. 1e shows, in a schematic representation, an example of a drive that is known from the prior art.
Figure 1B:
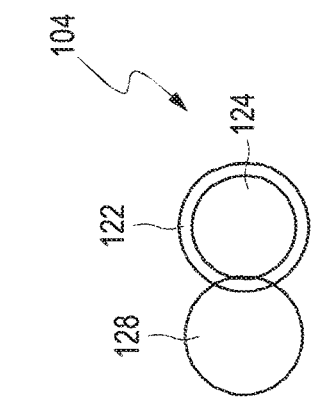
FIG. 1b shows, in a schematic representation, an example of a drive that is known from the prior art.
Figure 1D:
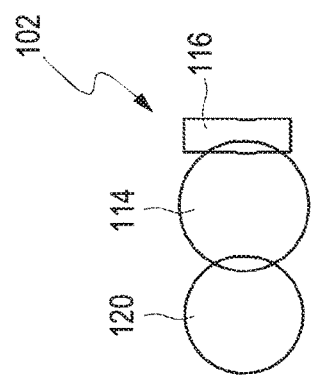
FIG. 1d shows, in a schematic representation, an example of a drive that is known from the prior art.
Figure 1F:
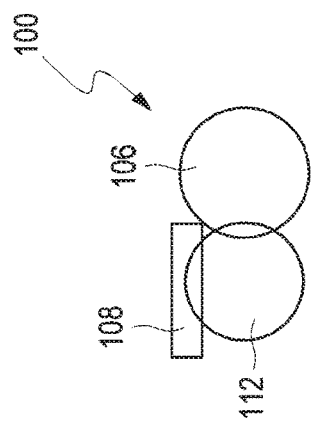
FIG. 1f shows, in a schematic representation, an example of a drive that is known from the prior art.

FIGS. 1a-1f show overall three examples of arrangements 100, 102, 104, which are known from the prior art, for driving vehicles. In this case, FIGS. 1a and 1b show a first example of the arrangement 100 from two different perspectives. FIGS. 1c and 1d show a second example of the arrangement 102 from two different perspectives. In addition, FIGS. 1e and 1f show a third example of the arrangement 104 from two different perspectives.

The first example of the arrangement 100, which is shown in FIG. 1a from the top and in FIG. 1b from the front comprises an electric motor 106, a power electronics unit 108, and a transmission 110, which has a differential 112. In this case, the electric motor 106 and the differential 112 are arranged next to one another, and the power electronics unit 108 is disposed above the differential 112. Of course, the possible volume for a trunk space of a vehicle is reduced by the power electronics unit 108, which is arranged above the differential 112.

The second example of the arrangement 102 has an electric motor 114, a power electronics unit 116, and a transmission 118 with a differential 120. In this case, FIG. 1c shows the second example of the arrangement 102 from the top, and FIG. 1c shows it from the front. It is provided here that the electric motor 114 is arranged between the differential 120 of the transmission 118 and the power electronics unit 116. If a vehicle that comprises the second example of the arrangement 102 should be involved in a crash, the danger exists here that the power electronics unit 116 is impacted early on by the crash.

The third example of the arrangement 104 is shown from above in FIG. 1e and from the front in FIG. 1f. Also, this third example of the arrangement 104 comprises an electric motor 122, a power electronics unit 124, and a transmission 126, which in turn has a differential 128. In this case, it is provided that the power electronics unit 124 and the differential 128 are arranged directly next to one another. The power electronics unit 124 and the electric motor 122 are arranged here one after the other, wherein a section of the transmission 126 is arranged here between the electric motor 122 and the power electronics unit 124.

Figure 2A:
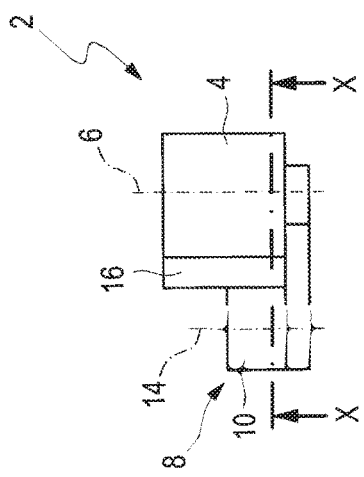
FIG. 2a shows, in a schematic representation from a first perspective, a first embodiment of the drive device according to the invention, which is manufactured by a first embodiment of the method according to the invention.
Figure 2B:
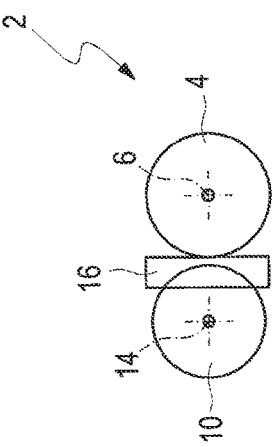
FIG. 2b shows, in a schematic representation from a second perspective, a first embodiment of the drive device according to the invention, which is manufactured by a first embodiment of the method according to the invention.

The first embodiment of the drive device 2 for driving a vehicle according to the invention is shown schematically in FIG. 2a from above in a plan view, and in FIG. 2b in a sectional view through a plane X-X of FIG. 2a. In this case, said drive device 2 comprises an electric motor 4 having a shaft 6 designed as a rotor shaft. In addition, said drive device 2 comprises a transmission 8 with a first transmission component 10 and a second transmission component 12, wherein here the first transmission component 10 is designed as a differential and/or has a differential. Furthermore, the transmission 8 here comprises a shaft 14 which is formed as an output shaft and which is arranged here parallel to the shaft 6 of the electric motor 4. As another component, the drive device 2 comprises a power electronics unit 16, which is arranged here between the shaft 6 of the electric motor 4 and the shaft 14 of the transmission 8. According to definition in each case, the power electronics unit 16 is arranged at least partially between the electric motor 4 and the first transmission component 10 or the differential of the transmission 8. The shaft 6 of the electric motor 4 as well as the shaft 14 of the transmission 8 can be joined and/or are joined rotatably here to each other.

Figure 3:
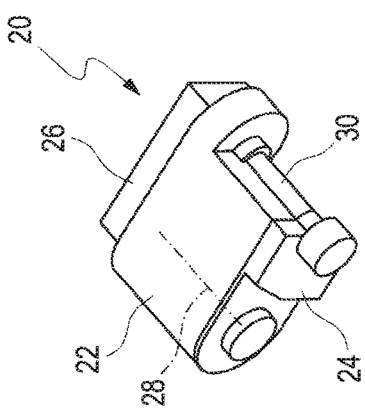
FIG. 3 shows, in a schematic representation, a second embodiment of the drive device according to the invention, which is manufactured by a second embodiment of the method according to the invention.

The second embodiment of the drive device 20 for driving a vehicle according to the invention, which is shown schematically in FIG. 3, comprises a first housing 22, which has a closable cover 24, and a second housing 26. In this case, an electric motor, which has a shaft 28 formed as a rotor shaft, is arranged in the first housing 22, the shaft being shown in FIG. 3 by the dashed line. In addition, a first component, here a differential, of a transmission is arranged in the first housing 22, while a second component of this transmission is arranged in the second housing 26. FIG. 3 also shows a shaft 30 of the transmission, wherein a section of this shaft 30 is arranged outside the first housing 22. In addition, this shaft 30 of the transmission is arranged parallel to the shaft 28 of the electric motor. The two shafts 28, 30, in addition, are joined together rotatably by the second transmission component inside the second housing 26. The two shafts 28, 30 are further arranged perpendicular to a direction of travel of the vehicle. It is provided that the cover 24 of the first housing is removable. For manufacturing the drive device 20, the cover 24 of the first housing 22, in which the electric motor and the first transmission component are already arranged, is removed, whereby the first housing 22 is opened. After this, a power electronics unit is pushed into the housing 22 through an opening in it, parallel to the two shafts 28, 30, and in this case is arranged between the two shafts 28, 30. After this, the opening of the first housing 22 is closed by the cover 24.

Figure 4:
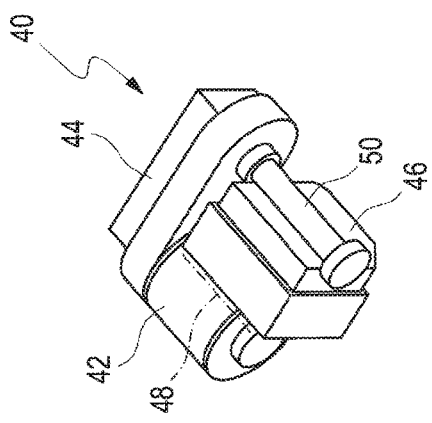
FIG. 4 shows, in a schematic representation, a third embodiment of the drive device according to the invention, which is manufactured by a third embodiment of the method according to the invention.

The third embodiment of the drive device 40 for driving a vehicle according to the invention, which is shown schematically in FIG. 4, comprises an electric motor 42, a transmission 44, which has at least one transmission component designed as a differential, and a power electronics unit 46. It is provided here that the electric motor 42 and the power electronics unit 46 have separate housings. In addition, the electric motor 42 has a shaft 48 (depicted by the dashed line), which is designed here as a rotor shaft and is arranged inside the housing of the electric motor 42. Parallel thereto is arranged a shaft 50 of the transmission 44, which is designed as an output shaft, and which is arranged here outside a housing of the transmission 44, wherein the transmission 44 has at least one transmission component that is designed and/or is to be designated as a differential. It is also provided here that the power electronics unit 46 is arranged here between the shaft 48 of the electric motor 42 and the shaft 50 of the transmission 44. In addition, the power electronics unit 46 is also arranged here between the housing of the electric motor 42 and the shaft 50 of the transmission 44.

Figure 5:
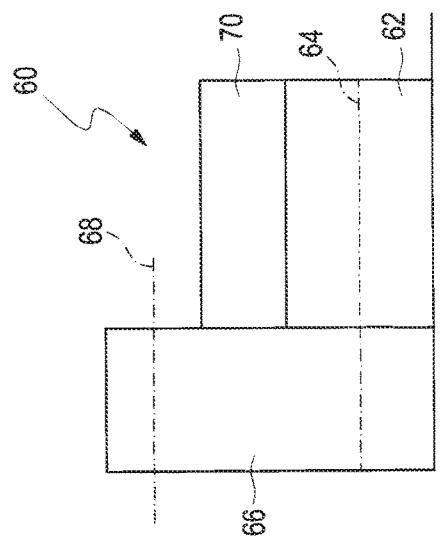
FIG. 5 shows, in a schematic representation, a fourth embodiment of the drive device according to the invention, which is manufactured by a fourth embodiment of the method according to the invention.

The fourth embodiment of the drive device 60 for driving a vehicle according to the invention is shown schematically in FIG. 5 and has an electric motor 62 with a shaft 64, which is designed as a rotor shaft; a transmission 66 with a shaft 68, which is designed as an output shaft; and a power electronics unit 70. In addition, the transmission 66 has at least one transmission component designed as a differential. The two shafts 64, 68 of the electric motor 62 and the transmission 66 are arranged here parallel to one another and perpendicular to a provided direction of travel of the vehicle. As in the case of the embodiments of the drive device 2, 20, 40 presented in the preceding, it is also provided here that the power electronics unit 70 is arranged between the shaft 64 of the electric motor 62 and the shaft 68 of the transmission 66.

An embodiment of the drive device 2, 20, 40, 60 according to the invention, which is presented each time, is manufactured by an embodiment of the method according to the invention. In this case, it is provided each time that the particular shaft 6, 28, 48, 64 of the electric motor 4, 42, 62 and the particular shaft 14, 30, 50, 68 of the transmission 8, 44, 66 are joined together rotatably. In addition, the power electronics unit 16, 46, 70 is arranged between the two corresponding shafts 6, 14, 28, 30, 48, 50, 64, 68. In this case, in one embodiment of a respective method, it is possible to push in the power electronics unit 16, 46, 70, according to definition laterally and/or from the front, between the two corresponding shafts 6, 14, 28, 30, 48, 50, 64, 68 or from the front, i.e., parallel to the two shafts 6, 14, 28, 30, 48, 50, 64, 68, to set the unit onto the transmission 8, 44, 66, i.e., at least onto a transmission component 12 and/or a housing 26 of a particular transmission component 8, 44, 66.

The invention claimed is:

1. A drive device for a vehicle comprising:
   an electric motor, a power electronics unit, and a transmission,
   wherein the power electronics unit is arranged between a shaft of the electric motor and an output shaft of the transmission,
   wherein the shaft of the electric motor and the output shaft of the transmission are parallel to each other and are provided on the same side of the transmission.

2. The drive device according to claim 1, wherein the transmission has a differential, wherein the differential includes the output shaft of the transmission, wherein the power electronics unit is arranged between the shaft of the electric motor and the shaft of the differential.

3. The drive device according to claim 1, wherein the shaft of the electric motor is designed as a rotor shaft.

4. The drive device according to claim 1, wherein the electric motor and the power electronics unit are arranged in a housing.

5. The drive device according to claim 1, wherein the power electronics unit is arranged in its own housing.

6. A method for manufacturing a drive device for a vehicle, composed of an electric motor, a power electronics unit, and a transmission,
   wherein the power electronics unit is arranged between a shaft of the electric motor and an output shaft of the transmission,
   wherein the shaft of the electric motor and the output shaft of the transmission are parallel to each other and are provided on the same side of the transmission.

7. The method according to claim 6, wherein the electric motor and the transmission are first joined together, and in which only after this is the power electronics unit arranged between the shaft of the electric motor and the output shaft of the transmission.

8. The method according to claim 6, wherein the power electronics unit is pushed between the shaft of the electric motor and the output shaft of the transmission.

9. The method according to claim 6, wherein the power electronics unit is arranged in a housing, which has an opening that can be closed by a cover, wherein the cover is opened, wherein the power electronics unit is arranged in the housing through the opening, and wherein the opening is closed again with the cover.

\* \* \* \* \*